United States Patent
Gerardus van Lieshout et al.

(10) Patent No.: US 8,917,438 B2
(45) Date of Patent: Dec. 23, 2014

(54) ELECTRONIC COLOR DISPLAY USING AN ELECTROWETTING PRINCIPLE WHEREIN THE DISPLAY COMPRISES BLACK MATRIX PATTERNS THAT ARE ALIGNED WITH A CONTROL MEANS

(75) Inventors: Petrus Johannes Gerardus van Lieshout, Eindhoven (NL); Hjalmar Edzer Ayco Huitema, Eindhoven (NL)

(73) Assignee: Creator Technology B.V., Breda (NL)

( * ) Notice: Subject to any disclaimer, the term of this patent is extended or adjusted under 35 U.S.C. 154(b) by 446 days.

(21) Appl. No.: 12/855,426

(22) Filed: Aug. 12, 2010

(65) Prior Publication Data

US 2012/0038861 A1    Feb. 16, 2012

(51) Int. Cl.
  G02B 26/00 (2006.01)
  G02F 1/167 (2006.01)
  G02B 5/20 (2006.01)
  G02F 1/1335 (2006.01)

(52) U.S. Cl.
  CPC ............... G02F 1/167 (2013.01); G02B 5/201 (2013.01); G02F 1/133514 (2013.01)
  USPC ........................... 359/296; 359/295; 359/297

(58) Field of Classification Search
  USPC .............. 349/106–109; 345/84, 88, 107, 214; 359/295, 297
  See application file for complete search history.

(56) References Cited

U.S. PATENT DOCUMENTS

| | | | |
|---|---|---|---|
| 2006/0103909 A1* | 5/2006 | Benning et al. | 359/237 |
| 2007/0243110 A1 | 10/2007 | Chiou et al. | |
| 2008/0186581 A1* | 8/2008 | Bita et al. | 359/578 |
| 2009/0168144 A1 | 7/2009 | Lo et al. | |
| 2009/0195850 A1 | 8/2009 | Takahashi | |
| 2010/0029335 A1* | 2/2010 | Vartanian | 455/566 |
| 2010/0033451 A1 | 2/2010 | Shinn et al. | |
| 2010/0060974 A1 | 3/2010 | Wang et al. | |

FOREIGN PATENT DOCUMENTS

| | | | |
|---|---|---|---|
| WO | WO 2005/038764 A1 | 4/2005 | |
| WO | WO 2007/063440 A1 | 6/2007 | |

OTHER PUBLICATIONS

US Patent Office, Office Action, U.S. Appl. No. 13/929,729, Jan. 27, 2014, US.

* cited by examiner

Primary Examiner — Paul Lee

(57) ABSTRACT

A color display, and an electronic apparatus comprising the color display, are described herein. The display comprises an illumination unit overlaid with a color filter arranged with a plurality of color filter elements, wherein respective transmissions of the color filter elements are adjustable to allow either transmission for a selected wavelength in said range of wavelengths, or transmission for a number of wavelengths from said range of wavelengths. Such adjustable transmission may be implemented using actuatable fluids which may be controlled by means of electrowetting.

16 Claims, 3 Drawing Sheets

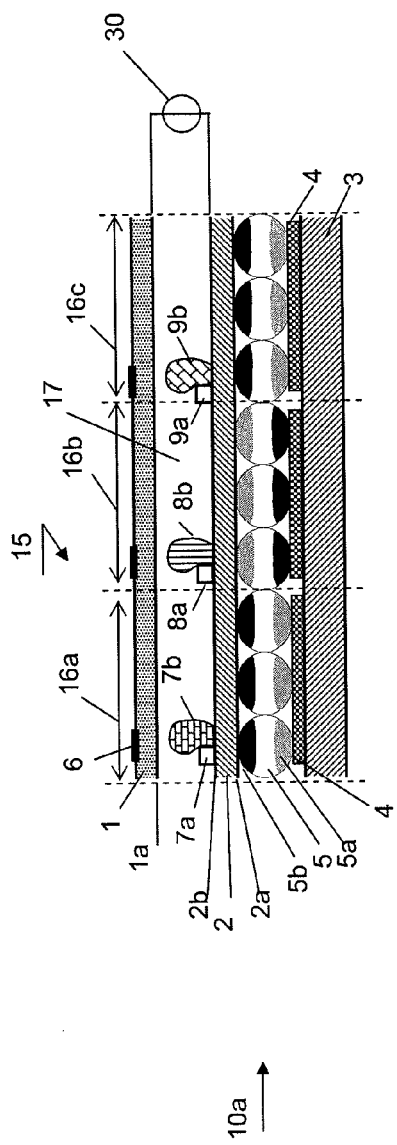
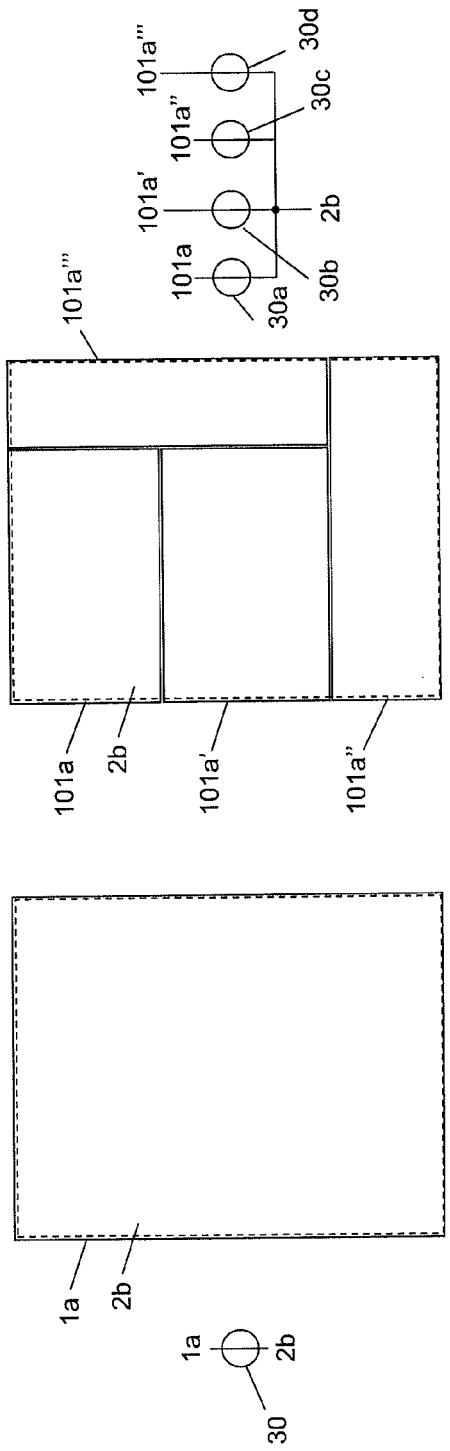
Fig. 3a
Fig. 3b
Fig. 3c

ELECTRONIC COLOR DISPLAY USING AN ELECTROWETTING PRINCIPLE WHEREIN THE DISPLAY COMPRISES BLACK MATRIX PATTERNS THAT ARE ALIGNED WITH A CONTROL MEANS

FIELD OF INVENTION

The invention relates to an electronic color display comprising a color filter. The invention further relates to an electronic device comprising an electronic color display provided with a color filter.

BACKGROUND OF INVENTION

An embodiment of an electronic display provided with a color filter is known from WO2007/063440. The known electronic display comprises a display effect layer, which may be arranged to reflect or to emit light with a broad spectrum (white light) over which a color filter layer is superposed. The color filter layer is arranged to change the white light into colored light by intercepting specific wavelengths. The display effect layer and the color filter layer need to be properly aligned, for example to prevent parallax or aperture problems.

SUMMARY OF THE INVENTION

In some instances, a compromise between brightness and color saturation has to be made in color displays. Display effects such as reflective electrophoretic or reflective/transmissive LCD enable good black and white brightness. Color is usually implemented by combining these black and white displays with an array of color filters. In order to produce saturated colors, the color filters need a substantially high absorption for wavelengths of a different color. This may decrease the brightness of white by 50-70% compared to the original black/white pixel brightness.

Handheld, display-based devices, such as e-readers, mobile phones, PDA's, or the like are used for a great variety of applications. For reading, usually a black and white display is preferable, while for picture or graphics viewing, a full-color display may be needed. In addition, the display has to have sufficient brightness and/or contrast for a variety of ambient lighting conditions, for example for an indoor and outdoor use.

It is an object of at least one invention contemplated herein to provide a color display enabling substantially optimized brightness and/or contrast for a variety of ambient lighting conditions and/or use modes.

To this end the electronic color display according to one contemplated invention comprises a color filter arranged with a plurality of color filter elements, said color filter being overlaid on an illuminating area of the display, said illuminating area being arranged to emit, transmit or reflect light in a range of wavelengths, wherein respective transmission of the color filter elements is adjustable.

The technical measure of one contemplated invention is based on the insight that by allowing a purposeful adjustment of the transmission of a color filter element either transmission of part of the said range of wavelengths, or transmission of substantially the full said range of wavelengths may easily be enabled in a reproducible way.

The technical measure of one contemplated invention is based on a further insight that by providing the filter elements of the color filter with adjustable transmission, preferably with adjustable transmission and saturation, the electronic display properties, like brightness and/or contrast and/or saturation do not have to be optimized for a given application, but, instead, these display properties may be tuned on demand based upon a currently used application or ambient conditions.

In accordance with one contemplated invention respective transmissions of the color filter elements are modified for a selected wavelength or wavelengths. Such modification or adjustment may be carried out pursuant to an envisaged utilization mode of the device, or pursuant to ambient parameters, like ambient lighting conditions.

In particular, the illumination unit may be arranged to produce white or black pixels. The illumination unit may relate to a reflective active-matrix display, although this embodiment is not limiting. The filter elements of the color filter may advantageously be arranged to enable high or maximum transmission to wavelengths corresponding to a substantially white spectrum. In this way displaying of a black/white picture is enabled. It will be appreciated that grey shades are seen as intermediate levels between black and white. Alternatively, when the pixels of the color filter are adjusted to enable high or maximum transmission only for part of the visible-light spectrum, for example, for red, blue or green color, a colored displaying mode is enabled. As a result, a versatile color display is provided, which has optimum brightness or, optionally optimum brightness and contrast, in particular for black and white displaying. Furthermore, it is noted that the lowest reflectance in black can be obtained by displaying black using the illumination unit and switching the pixels of the color filter to pass only part of the visible-light spectrum, thereby roughly reducing the overall black reflectance by a factor of three. However, for this black level to be used in conjunction with other shades of grey or colors, the color filter pixels need to be individually addressable.

In an embodiment of the color display according to one contemplated invention the color filter comprises an array of switchable elements, the switching state of these elements determining the part of the visible-light spectrum that is transmitted by the switchable elements.

It is found to be particularly preferable to provide the color filter with filter elements operating using the electrowetting principle, because in this way a substantially instantaneous and independent adjustment of the filter elements is possible. Implementation of red, blue or green filter elements may be provided by using respectively colored liquids arranged within such filter elements. The principle of electrowetting is known in the art. An example of an apparatus arranged with actuatable fluid is known from US 2007/0243110.

It will be appreciated that although in the US 2007/0243110 reference is made to a macroscopic device, manufacturing of a filter array comprising substantially microscopic filter elements operating using the electrowetting principle lies within ordinary skill of the artisan. However, it will be appreciated that for enabling operating of the adjustable filter elements filled with the actuatable fluid, each cell comprising the actuatable fluid should have electrodes fed by a power supply. The power supply, electrically connected to a common unpatterned electrode, may be controllable by a suitable processor for setting a desired voltage across the cell for altering spatial filling of the cell by the actuatable fluid. More details on this embodiment will be presented with reference to FIG. 3a.

In a further embodiment of the color display according to one contemplated invention the illuminating area is arranged with black and white pixels, the filter elements of the color filter dimensionally correspond to and are aligned with said black and white pixels.

It is found to be advantageous that the elements of the color filter correspond to the pixels of the illumination area. In this way a one-to-one translation of envisaged display mode requirements to suitable filter characteristics can be made.

In a particular embodiment color display brightness and/or resolution of the color display are adjustable.

It is found that the respective resolutions of the display and the controllable color filter comprising color filter elements do not have to be the same. For example, should the resolution of the display be 2 times higher in x- and y-directions than the resolution of the color filter, in the color mode, such difference in resolution may be used to generate extra colors and/or adjust brightness. Should the resolution of the color filter be higher than the resolution of the display, this difference may be used to optimize use of the white channel in color mode.

In a still further embodiment of the color display according to one contemplated invention the color filter comprises a first display portion and at least a second display portion, the filter elements of the first display portion and the at least second display portion being controlled independently from each other.

It is found to be advantageous instead of having one area to provide a suitable plurality of such areas. This may result in enabling different settings with respect to color saturation and brightness for different areas of the color filter. Such functionality may be advantageous, for example, when different viewing areas of the display have different purposes. Such embodiment may be enabled by replacing the unpatterned common electrode in the switchable filter element stack by two or more patterned electrodes. In this case a provision of a suitable plurality of independent power sources may be required. This embodiment is discussed in further details with reference to FIG. 3c.

In a still further embodiment of the color display according to one contemplated invention a substrate has a display counter electrode for controlling the illumination area and a color filter electrode for controlling the color filter, the display counter electrode and the color filter electrode being joined. This feature has an advantage that by choosing a suitable material for a substrate layer normally separating the display counter electrode and a color filter electrode, said electrodes may be joined. As a result the overall brightness of the illumination unit may increase. This feature will be further discussed with reference to FIG. 1.

In a still further embodiment of the color display according to one contemplated invention the illumination area comprises an array of transmissive elements.

It is found to be advantageous to combine the color filter with an illumination unit having a transmissive display effect. In this case the color filter may be combined either with a backlight, or with reflective pixel pads. For such arrangements, it is possible to position the color filter in front of the illumination unit, or between the illumination unit and backlight or reflection layer.

One contemplated invention further relates to an electronic portable device comprising an electronic color display as is described with reference to the foregoing. The electronic portable device relates, by way of example, to a mobile phone, an e-reader, an organizer, a palm-top or the like. Advantageously, the color display may be settable in a first mode and in a second mode, wherein said transmission for the selected wavelength and for said wavelength range may be adjustable based on the first mode and the second mode. Preferably, the first mode corresponds to a reading mode and the second mode corresponds to a picture viewing mode. In an exemplary case, said first mode is arranged for enabling monochromic displaying, said second mode is arranged for enabling polychromic displaying.

For example, for e-reading, the color display may be set into a high-resolution, high-brightness monochrome mode. For picture viewing, the display can be put in color mode. In the color mode, color saturation may be increased while somewhat decreasing brightness. Mode selection of the display may be carried out by a single power source to which the display is connected. It will be appreciated that the illumination unit may comprise electrophoretic material and may be driven in accordance with conventional driving used for actuating an electrophoretic display.

These and other aspects of the invention will be discussed in further detail with reference to drawings, wherein like reference signs represent like elements. It will be appreciated that the drawings are provided for illustrative purposes only and may not be used for limiting the scope of the appended claims.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3a presents a schematic view of an embodiment of a color display according to the invention provided with a single power source for switching the filter elements;

FIG. 3b schematically depicts a top view of the electrodes 1a and 2b (of FIG. 3a) required for implementing such operation of the device; and FIG. 3c schematically depicts an embodiment of a color display according to the invention provided with a plurality of power sources adapted for switching filter elements in different areas of the display separately.

DETAILED DESCRIPTION OF THE DRAWINGS

Figure 1:
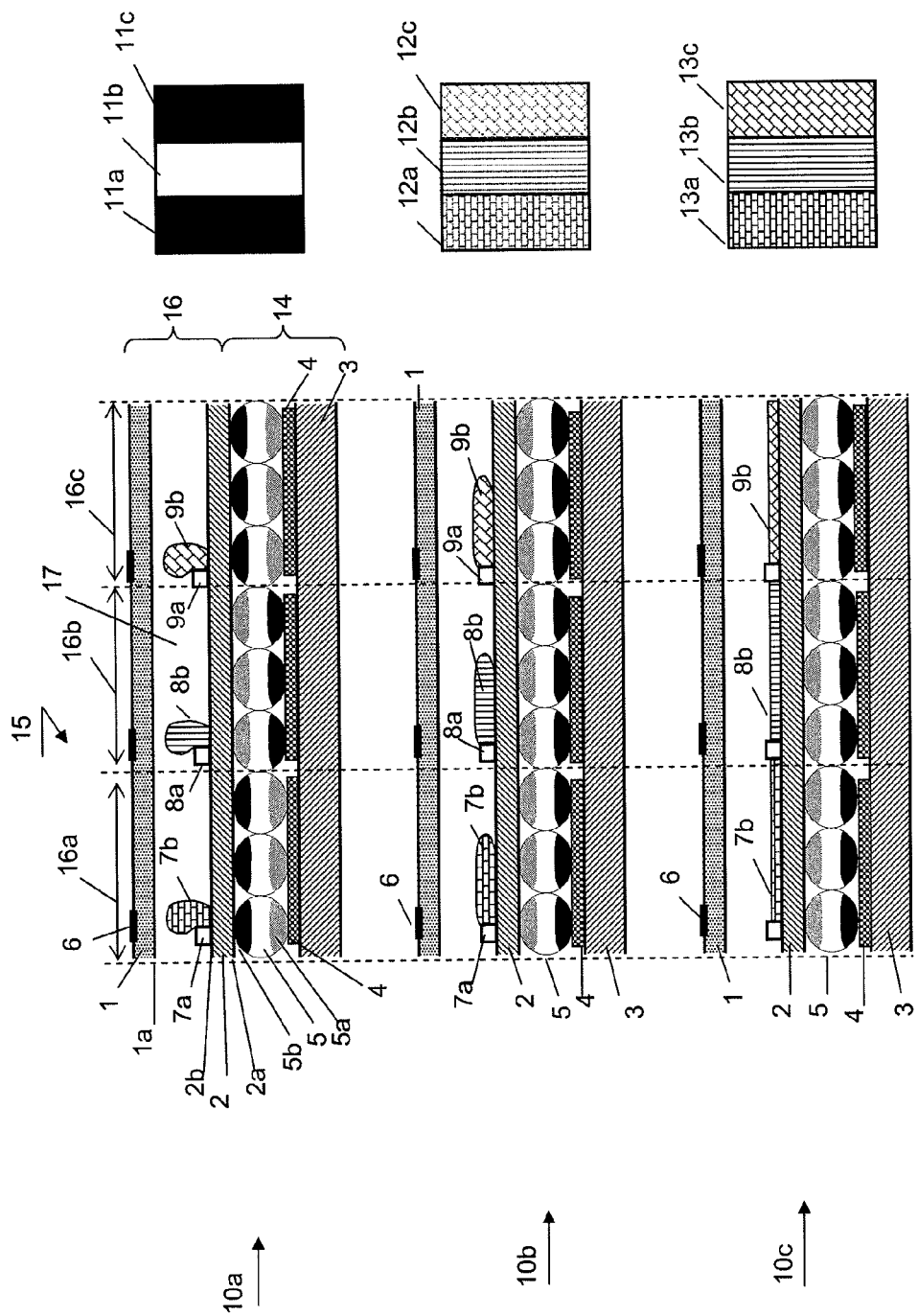
FIG. 1 presents schematic cross-sectional views of an embodiment of a color display provided with an adjustable color filter according to the invention.

FIG. 1 presents a schematic view of an embodiment of a color display provided with an adjustable color filter according to an embodiment of the invention. The color display 15 according to the embodiment comprises an illumination unit 14 implemented as a display feature comprising a lower substrate 3 provided with a suitable pixel pad 4 arranged to control suitable electrophoretic capsules 5. The electrophoretic capsules 5 comprise, for example, charged white particles 5a and black particles 5b dispersed in a clear fluid (or white particles dispersed in for example black or colored fluid, not shown) and may be arranged to operate in a reflective way. In order to actuate the electrophoretic capsules the illumination unit 14 comprises a display counter electrode 2a arranged on a further substrate 2, wherein a suitable actuation voltage may be applied between electrodes 4 and 2a. In accordance with the illustrative embodiment the illuminating unit 14 is overlaid with a color filter arranged with a plurality of color filter elements 16a, 16b, 16c, wherein respective transmissions of the color filter elements 16a, 16b, 16c are adjustable to allow either transmission for a selected wavelength emanating from elements 7b, 8b, 9b in said range of wavelengths, or transmission for a number of or all the wavelengths from said range of wavelengths.

In the illustrative embodiment of the color display 15, the color filter comprises an array of filter elements 16a, 16b, 16c comprising respective fluids 7b, 8b, 9b, wherein said fluids are actuated using electrowetting principle using among others suitable control means 7a, 8a, 9a arranged for implementing the electrowetting principle. Preferably, the color filter 16 is arranged with basic red-green-blue filters, which may be implemented by providing suitably colored oil 7b, 8b, 9b in a suitable coupling medium 17, for example water, which may at least partially fill respective color filter elements 16a, 16b, 16c. In order to actuate the color oils, the color filter comprises a filter counter electrode 1a arranged to apply a suitable actuating voltage on a wall of the filter element corresponding to the filter elements 16a, 16b, 16c. The filter counter electrode 1a is preferably positioned on a still further substrate 1. Finally, the color display 15 may comprise a black matrix 6 arranged either on top of the substrate 1 as shown in FIG. 1 or on the bottom side of the substrate 1 (not shown). An embodiment of an actuation mode of the color filter will be discussed with reference to views 10a, 10b and 10c.

In view 10a an actuation mode is shown wherein the color filter elements are set for allowing high or maximum transmission to a wide range of light wavelengths emanating from the illumination unit 14. By way of example, substantially whole white light spectrum is transmitted. For this purpose a first actuating voltage is applied to the respective walls of the color filter elements 16a, 16b, 16c so that the colored oil is substantially limited to an area below the black matrix 6. The actuation voltage may be applied between the electrodes 2b and 1a. It will be appreciated that the colored oil 7b, 8b, 9b may be fed to the respective pixels from corresponding reservoirs. It is possible that, alternatively, the filter elements 16a, 16b, 16c are actuated in such way that the respective colored oils are transported away from the filter elements 16a, 16b, 16c towards the reservoir.

A corresponding image resulting from such actuation mode may be represented by a series of black and white pixels 11a, 11b, 11c. It can also represent grey tones. This image may have high resolution, high brightness and is substantially monochrome, which may correspond to a reading mode of the color display 15.

In view 10b a further mode is given, wherein the filter elements 16a, 16b, 16c are actuated in such way that the respective color oils 7b, 8b, 9b partially cover respective area of the color filter elements. A corresponding image is represented by a series of polychrome pixels 12a, 12b, 12c which may have a normal resolution, medium brightness and medium color saturation. The color of the pixels 12a, 12b, 12c correspond to the color of the respective liquids, for example oils 7b, 8b, 9b. Those skilled in the art would readily appreciate, in view of the disclosure herein, which class of liquids is suitable for electrowetting.

In view 10c a still further mode is given, wherein the filter elements 16a, 16b, 16c are actuated in such way that respective area of the color filter elements are fully filled with the respective color oils. The resulting image is represented by a sequence of pixels 13a, 13b, 13c which may have normal resolution, low brightness and high color saturation.

It will be appreciated that instead of providing non-patterned electrodes 2b and 1a, either one of the electrodes may be patterned resulting in different portions of the color filter having different settings, for example with respect to color saturation and brightness. In this way, however, each filter portion must have its own power source. This further embodiment is discussed in further detail with reference to FIG. 3c.

In addition or alternatively, the substrate 2 may be arranged for joining electrodes 2a and 2b. Omission of one electrode layer may result in an increase of an overall brightness.

It will be appreciated that the color display 15, instead of using display effect based on electrowetting effect, other display effects may be used, like for example a display effect based on Ch-LC (Cholesteric Liquid Crystal), GH-LC (Guest-Host Liquid Crystal), based on PDLC (Polymer Dispersed Liquid Crystal) or based on MEMS (Micro Electro-Mechanical Systems).

Figure 2:
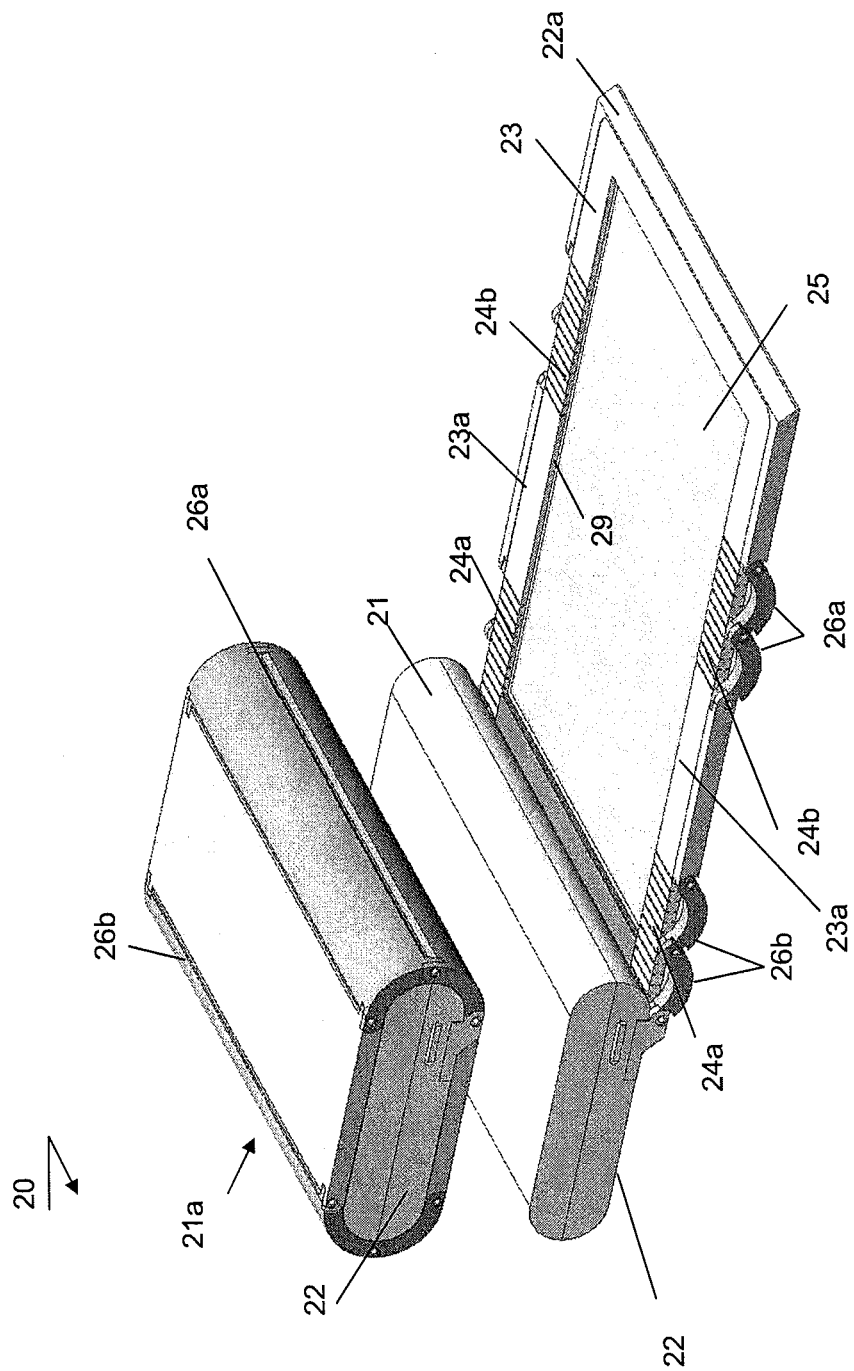
FIG. 2 is an illustrative depiction of an embodiment of an electronic device incorporating a color display according to the invention.

FIG. 2 presents an embodiment of an electronic device according to an illustrative example of the invention. The electronic device 20 comprises a housing 22 and a retractable, notably wrappable display 25, preferably arranged on a rigid cover 22a. The display 25 is provided with the adjustable color filter as is described with reference to the foregoing. The display 25 may be arranged in accordance with the embodiment described with reference to FIG. 1. Alternatively, the display 25 may be arranged with other suitable means to enable due adjustment of the filter elements transmission for one or more wavelengths. The rigid cover 22a may be arranged to be wound together with the display 25 around the housing 22 to a position 21a. The rigid cover 22a may comprise an edge member 23 provided with rigid areas 23a and flexible areas 24a, 24b cooperating with hinges 26a, 26b of the cover 22a. When the display 25 is being retracted to the position wound about the housing 22, the surface of the display 25 may abut the housing 22. Preferably, the housing 22 or display 25 comprise means (not shown) for enabling selection of the mode for controlling transmission settings of the individual color filter elements for providing optimum viewing mode with regard to at least brightness and resolution. Selection of the viewing mode can be on the initiative of the user or it can be coupled to metadata of the image to be displayed. Alternatively, if no metadata is available, the properties of the image to be displayed can be determined by image analysis or be controlled by the application (computer program executing on the device 20) that is used to render the image. It will be appreciated that instead of a wrappable display the electronic apparatus may comprise a rollable display, so that the flexible display 25 is arranged to be rolled over a suitable roller upon storage, preferably inside a portion of a housing, or a rigid display, arranged on the outside of a device housing.

FIG. 3a schematically presents an embodiment of a color display according to an embodiment of the invention provided with a single power source for switching the filter elements.

The color display 15, according to an aspect of the illustrative embodiment of the invention, is arranged for enabling a unified response from all filter elements 16a, 16b, 16c, as the respective actuatable fluids 7b, 8b and 9b are controlled by a common power supply 30 via the respective control means 7a, 8a and 9a. When a trigger voltage is provided across a cell corresponding to liquids, using electrodes 1a and 2b, respective spatial distribution of the actuatable fluids across the filter elements 16a, 16b, 16c may be changed, see views 10a, 10b and 10c presented in FIG. 1.

It will be appreciated that other items depicted in FIG. 3a may be substantially the same as items discussed with reference to FIG. 1. Accordingly, respective electrophoretic capsules 5 may comprise charged white particles 5a and black particles 5b dispersed in a clear fluid (or white particles dispersed in for example black or colored fluid, not shown) and may be arranged to operate in a reflective way. In order to actuate the electrophoretic capsules the illumination unit 14 comprises a display counter electrode 2a arranged on a further substrate 2, wherein a suitable actuation voltage may be applied between electrodes 4 and 2a. In accordance with the invention the illuminating unit 14 is overlaid with a color filter arranged with a plurality of color filter elements 16a, 16b, 16c, wherein respective transmissions of the color filter elements 16a, 16b, 16c are adjustable to allow either transmission for a selected wavelength emanating from elements 7b, 8b, 9b in said range of wavelengths, or transmission for a number of, or all, the wavelengths from said range of wavelengths. FIG. 3b schematically presents a top view of the electrodes 1a and 2b required for implementing such operation of the device.

FIG. 3c presents in a schematic way an embodiment of a color display according to the invention provided with a plurality of power sources adapted for switching filter elements in different areas of the display separately. In this embodiment instead of having one electrode area as shown in FIG. 3b a plurality of electrode areas is patterned, 101a, 101a', 101a", 101a'". The bottom electrode 2b may be left common for all filter elements 16a, 16b, 16c.

In order to implement regional switching, each patterned electrode 101a, 101a', 101a", 101a'" is connected to a dedicated power source 30a, 30b, 30c, 30d. each of such power sources is arranged to apply a control voltage between an unpatterned bottom electrode 2b and a respective patterned sub-electrode 101a, 101a', 101a", 101a'". Such functionality is advantageous as it supports area-related switching of the display, allowing for presenting information on specifically designated display areas. For example, one area may be designated for control menu's, while another area may be designated for reading, e-mailing and so on.

Such sub-areas may even enable definition of different settings with respect to color saturation and brightness for different areas of the color filter. Such functionality may be advantageous, for example, when different viewing areas of the display have different purposes.

It will be appreciated that although specific embodiments of the color display and the electronic apparatus according to the invention are discussed separately for clarity purposes, interchangeability of compatible features discussed with reference to isolated figures is envisaged.

It will further be appreciated that in the present application the following terms shall have the following meaning:
"illuminating area" relates to a reflective, emissive and/or transmissive area of a display;
"brightness" relates to luminance in an emissive or backlit transmissive display; and reflectance in a reflective display;
"selected wavelength" relates to a part of the visible-light spectrum; can be associated with a certain color;
"filter element" relates to an element that passes selected wavelengths and suppresses other wavelengths.

While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. An electronic color display comprising:
a color filter arranged with a plurality of color filter elements, said color filter being overlaid on an illuminating area of the display, said illuminating area being arranged to emit, transmit or reflect light in a range of wavelengths, wherein the respective transmission of the color filter elements is adjustable;
wherein the color filter comprises an array of filter elements, each filter element comprising a liquid filled therein, a control means disposed within the liquid, and an electrode directly contacting the liquid, the control means and electrode configured to control a spatial distribution of the liquid relative to the control means, wherein the control means is configured for implementing an electrowetting principle;
wherein the display further comprises a black matrix having patterns that are arranged aligned with the control means, so that the liquid in each filter element is limited to an area below the corresponding pattern when an activation voltage is applied thereto to allow a maximum transmission.

2. The electronic color display according to claim 1, wherein the range of wavelengths corresponds to a substantially white spectrum.

3. The electronic color display according to claim 1, wherein the filter elements are adjustable to allow either transmission for a selected color, or transmission for a substantially white spectrum.

4. The electronic color display according to claim 2, wherein the filter elements are adjustable to allow either transmission for a selected color, or transmission for the substantially white spectrum.

5. The electronic color display according to claim 1, wherein the illuminating area is arranged with black and white pixels, the filter elements of the color filter being arranged to spatially and dimensionally correspond to said black and white pixels.

6. The electronic color display according to claim 1, wherein the color filter comprises a first portion and a second portion, the filter element of the first portion and the second portion being controlled independently from each other.

7. The electronic color display according to claim 1, further comprising a substrate provided with a display counter electrode for controlling the illumination area and a color filter electrode for controlling the color filter, the display counter electrode and the color filter electrode being joined.

8. The electronic color display according to claim 1, wherein brightness and/or resolution of the color display are adjustable.

9. The electronic color display according to claim 1, wherein the illumination area comprises an array of transmissive elements.

10. The electronic color display according to claim 1, wherein the color display is flexible.

11. The electronic color display according to claim 10, wherein the color display is collapsible.

12. An electronic portable device comprising an electronic color display according to claim 1.

13. The electronic portable device according to claim 12, said color display being settable in a first mode and in a second mode, said transmission for a selected wavelength and for said number of wavelengths being different in the first mode and the second mode.

14. The electronic display according to claim 13, wherein the first mode corresponds to a reading mode and the second mode corresponds to a picture viewing mode.

15. The electronic display according to claim 14, wherein said first mode transmission is arranged for enabling monochromic displaying, said second mode being arranged for enabling polychromic displaying.

16. The electronic color display according to claim 1, wherein each said liquid is in contact with the control means.

* * * * *